United States Patent [19]

Brüning et al.

[11] 4,445,523

[45] May 1, 1984

[54] APPARATUS FOR THE SURFACE CLEANING OF QUARTZ-CRYSTAL PIECES

[75] Inventors: Rolf Brüning, Bruchköbel; Klaus Reimann, Rodenbach, both of Fed. Rep. of Germany

[73] Assignee: Heraeus Quarzschmelze GmbH, Hanau am Main, Fed. Rep. of Germany

[21] Appl. No.: 489,929

[22] Filed: Apr. 29, 1983

Related U.S. Application Data

[62] Division of Ser. No. 312,470, Oct. 19, 1981.

[30] Foreign Application Priority Data

Oct. 25, 1980 [DE] Fed. Rep. of Germany ....... 3040385

[51] Int. Cl.³ ............................................. B08B 3/06
[52] U.S. Cl. ...................................... 134/65; 134/134
[58] Field of Search ..................... 134/65, 78, 79, 132, 134/134

[56] References Cited

U.S. PATENT DOCUMENTS

| | | | |
|---|---|---|---|
| 1,933,609 | 11/1933 | Wagner | 134/65 X |
| 2,545,239 | 3/1951 | McQuiston, Jr. et al. | 134/65 X |
| 4,022,638 | 5/1977 | Weet | 134/132 X |
| 4,073,301 | 2/1978 | Mackinnon | 134/65 |

*Primary Examiner*—Robert L. Bleutge
*Attorney, Agent, or Firm*—Sprung, Horn, Kramer & Woods

[57] ABSTRACT

Apparatus for cleaning the surface of small quartz-crystal pieces with aqueous hydrofluoric acid is disclosed wherein the quartz pieces are introduced into a vessel containing a conveying means and conveyed e.g. horizontally in counter-current to aqueous hydrofluoric acid introduced at the opposed end of the vessel. During the washing the quartz pieces are tumbled.

4 Claims, 1 Drawing Figure

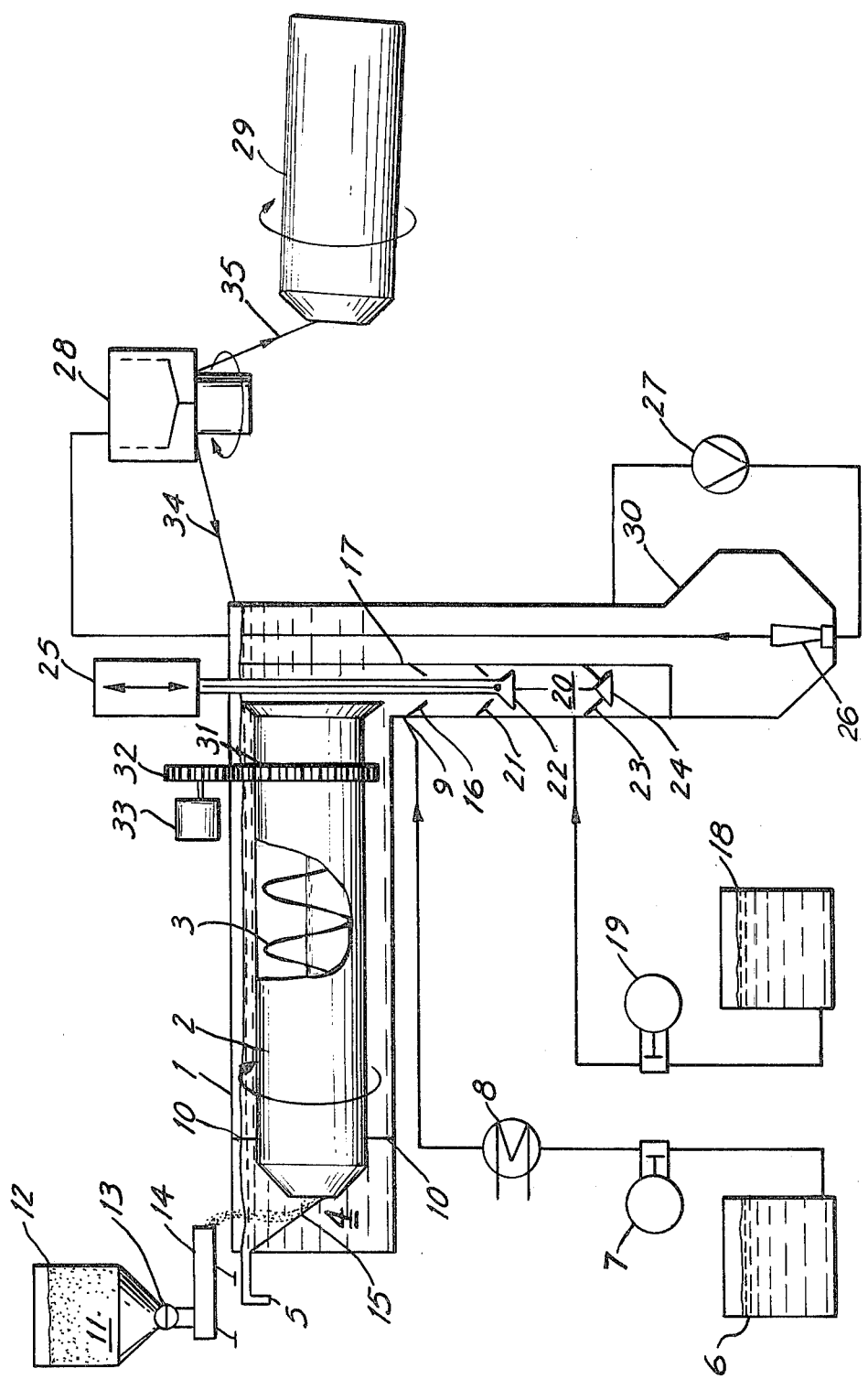

APPARATUS FOR THE SURFACE CLEANING OF QUARTZ-CRYSTAL PIECES

This is a division of application Ser. No. 312,470, filed Oct. 19, 1981.

BACKGROUND OF THE INVENTION

Field of the Invention

The invention relates to a method for the surface cleaning of small quartz-crystal pieces by subjecting them to the action of aqueous hydrofluoric acid, and to an apparatus for carrying out said method.

Quartz-crystal pieces which are used in the manufacture of vitreous shaped bodies are frequently contaminated on their surface with silicate impurities. The latter will dissolve in aqueous hydrofluoric acid much more rapidly than pure quartz. When quartz-crystal pieces so contaminated are retained in aqueous hydrofluoric acid for a sufficient length of time, the mineral impurities will therefore be completely dissolved while only a surface layer of minimal thickness will be removed from the quartz-crystal pieces. This discovery is utilized in industry in the surface cleaning of quartz-crystal pieces.

From German patent application DOS No. 24 31 928 there is known a method for the removal of various impurities, and particularly iron compounds, from quartz sand. In this method, the quartz sand and aqueous hydrofluoric acid are mixed at elevated temperature in a reactor, and acid and sand are then separated from each other by the use of a filter. In this method, the impure sand is acted upon by fresh, pure aqueous hydrofluoric acid, which, however, is consumed during cleaning by the formation of complex compounds, in particular fluosilicic acid. Since the hydrofluoric acid concentration is being reduced continually, there is no assurance with this method that mineral impurities of larger size are completely removed from quartz-crystal pieces.

It is an object of the present invention, therefore, to provide a reliable method for removal of mineral impurities adhering to the surfaces of quartz-crystal pieces, regardless of their size.

SUMMARY OF THE INVENTION

In accordance with the invention, this object is accomplished in that the quartz-crystal pieces are introduced into a conveying means and therein are conveyed countercurrently to the hydrofluoric acid, which also flows continuously through the conveying means, to the point of introduction of the hydrofluoric acid while being tumbled, and then are discharged from the conveying means.

It has been found advantageous to feed the quartz-crystal pieces continuously into the conveying means, to tumble them therein continuously, to convey them to the point of introduction of the hydrofluoric acid and to discharge them continuously from the aqueous hydrofluoric acid so that the residence time of the various quartz-crystal pieces in the hydrofluoric acid is constant.

The method is preferably carried out at a temperature ranging from 310 to 330 K, the contentration of the aqueous hydrofluoric acid introduced ranging from 10 to 40%, and more particularly from 25 to 30%. It has been found advisable to preheat the aqueous hydrofluoric acid prior to its introduction into the conveying means. While during the reaction of the hydrofluoric acid with the mineral impurities at the surface of of the quartz-crystal pieces heat is automatically supplied through the enthalpy of reaction being liberated, this occurs only over the first half of the conveying path, since there the quartz-crystal pieces are contaminated the most. If the hydrofluoric acid were not preheated, the nearly cleaned quartz-crystal pieces would only be contacted with fresh, cold hydrofluoric acid, which would make it necessary to increase the residence time until even traces of mineral impurities still present had been removed.

The continuous discharge of the cleaned quartz-crystal pieces may be effected by means of a bucket elevator, a screw conveyor or similar conveying means.

It has been found advantageous to wash off the aqueous hydrofluoric acid adhering to the surface of the quartz-crystal pieces from the hydrofluoric acid treatment with pure water and to dry the quartz-crystal pieces prior to their further processing.

BRIEF DESCRIPTION OF DRAWING

The method in accordance with the invention will now be described in terms of the cleaning of quartz sand with reference to an apparatus shown diagrammatically in the accompanying drawing.

DETAILED DESCRIPTION OF THE INVENTION

Disposed in a plastic-lined trough 1 is a plastic rotary-cylinder conveyor 2 provided with spiral internal structures 3. The rotary-cylinder conveyor 2 is constructed completely of polypropylene, and the plastic lining of the trough 1 is also made of polypropylene. The conveyor is driven through a ring gear 31 and a gear 32 by a variable-speed motor 33. The speed of rotation of the conveyor determines the residence time in the aqueous hydrofluoric acid of the quartz-crystal pieces to be treated.

The trough 1 is filled with aqueous hydrofluoric acid 4 to such a height that the rotary-cylinder conveyor is completely below the liquid level, which is determined by the overflow 5. Fresh, pure aqueous hydrofluoric acid is drawn from a storage tank 6 and by means of a metering pump 7 and through a heat exchanger 8 serving to preheat the hydrofluoric acid is piped to the point of introduction 9. A labyrinth seal 10 prevents the hydrofluoric acid from flowing directly to the overflow 5 and forces it to flow through the interior of the rotary-cylinder conveyor before passing to the overflow. Quartz sand 11 to be cleaned is drawn from a feed hopper 12 in a metered manner through a cellular-rotor lock 13 and by way of a vibrating chute 14 reaches the trough 1. There the quartz sand drops through the surface of the spent hydrofluoric acid, so that any lump formation through moist sand is precluded.

Below the liquid level, the quartz-crystal granules are conducted by the guide chute 15 into the rotary-cylinder conveyor 2. Through the spiral internal structures 3, the quartz sand is conveyed in the direction of the point of introduction of the hydrofluoric acid, the residence time of the quartz crystals in the conveyor 2 being variable over a wide range through the speed of rotation of said conveyor. After leaving the rotary-cylinder conveyor, the cleaned quartz sand falls through an opening 16 in the bottom of the trough 1 into a discharge means 17 where it is washed countercurrently with pure water. The latter is piped from a tank 18 by means of a pump 19 in a metered manner to a lock chamber 20. The latter has at its upper end an opening 21 which can be closed by a valve 22, and at its lower end an opening 23 which in the drawing is closed by a valve 24. The discharge means 17 thus comprises the bottom opening 16, the lock chamber 20, and the valves 22 and 24 whereby the openings 21 and 23, respectively, can be closed. The valve drive 25 is such that the two valves 22 and 24 operate in a push-pull arrangement, one of these two valves being closed whenever the other is open. With valve 22 open as shown, washed quartz sand enters the lock chamber 20 while pure water flows toward the quartz sand and enters the trough 1 through an opening 16 in its bottom. The hydrofluoric acid drawn from the storage tank 6 in this case is of a higher concentration than is necessary for cleaning of the sand. The lower concentration necessary for cleaning is obtained by mixing this highly concentrated acid with the pure water (from lock chamber 20), the ratio of acid to water being adjusted by means of the metering pump 7 and the pump 19.

From the lock chamber 20, the cleaned quartz sand which has been washed with water passes through the opening 23 into the intermediate container 30, at whose lowermost point an injector 26 operated by a pressure pump 27 is disposed. Through said injector, a mixture of cleaned quartz sand and water is moved into the centrifuge 28. The water there thrown off is returned to the intermediate container 30, as indicated by the arrow 34. The sand, which contains some slight residual moisture, is then conducted to a rotary kiln 29, as indicated by the arrow 35, where it is dried completely.

As is readily apparent from the embodiment described, the method in accordance with the invention has the advantage that the impure quartz-crystal pieces are treated with aqueous hydrofluoric acid of gradually increasing concentration. The spent and contaminated hydrofluoric acid comes only in contact with impure quartz-crystal pieces. The most readily soluble impurities are then dissolved in strongly diluted hydrofluoric acid, and for removal of larger or more difficultly soluble mineral impurity particles pure, fresh hydrofluoric acid is finally available. As a result, the enthalpy of reaction is liberated gradually and the sudden overheating which occurs at the start of the reaction in "one-pot" processes such as that of German Offenlegungschrift DOS No. 24 31 928 is avoided.

Through continuous operation a constant residence time and uniform treatment of all quartz-crystal pieces are secured. The discharge means for the quartz sand permits the simultaneous washing off of the hydrofluoric acid with pure water. The use of this wash water for dilution makes it possible to feed the apparatus with commercial concentrated hydrofluoric acid. Intermediate storage of the cleaned quartz sand in pure water permits the centrifuging to be done discontinuously and a simple centrifuge discharging through the bottom when at a standstill to be employed. Centrifuging off most of the moisture makes it possible to use a drying oven with relatively low heat requirements since but little thermal energy is required to remove the residual moisture.

The method in accordance with the invention can be used regardless of the size of the quartz-crystal pieces to be cleaned and is suited also for the cleaning of quartz sands of a particle size of under 0.5 mm.

What is claimed is:

1. An apparatus for cleaning the surface of small quartz crystal pieces comprising a trough (1) formed at least on its inside of a plastic and having an inlet (9) for introduction of pure aqueous hydrofluoric acid and an overflow (5) for removal of spent hydrofluoric acid, said trough containing therein a rotary-cylinder conveyor (2) made of plastic feeding means disposed in proximity to said overflow (5) for feeding quartz-crystal pieces into said trough (9) and discharge means (17) in proximity to said inlet of said trough (1) and said rotary-cylinder conveyor (2) being sealed relative to each other by means of a seal (10).

2. An apparatus according to claim 1, wherein the rotary-cylinder conveyor is constructed completely of polypropylene and the inside of the trough is also made of polypropylene.

3. An apparatus according to claim 1, wherein said discharge means comprises a vertical conduit containing a pair of valves serially disposed one over the other to define a lock chamber in said conduit, means for supplying pure water to said lock chamber and means for opening one of said valves while closing the other and vice versa.

4. An apparatus according to claim 3, further comprising means for conveying washed solids from said lock chamber to a centrifuge which conveying means comprises an injector.

* * * * *